UNITED STATES PATENT OFFICE.

ALBERT VERLEY, OF COURBEVOIE, FRANCE, ASSIGNOR TO THE SOCIÉTÉ ANGLO FRANCAISE DES PARFUMS PERFECTIONNÉS, LIMITED, OF SAME PLACE AND LONDON, ENGLAND.

PROCESS OF MAKING SULFONATES.

SPECIFICATION forming part of Letters Patent No. 646,772, dated April 3, 1900.

Application filed July 31, 1899. Serial No. 725,677. (No specimens.)

*To all whom it may concern:*

Be it known that I, ALBERT VERLEY, electrician, a citizen of the Republic of France, and a resident of 7 Quai de Seine, Courbevoie, near Paris, France, have invented a certain new and useful Manufacture and Production of Certain Organic Sulfonates and Substances Derived Therefrom, (for which I have applied for a patent in Great Britain, No. 27,521, dated December 30, 1898,) which invention is fully set forth in the following specification.

My invention consists in the manufacture and production of certain organic sulfonates and substances derived therefrom.

According to this invention I sulfonate bodies containing a phenolic or even an alcoholic group in such a way that the sulfonic-acid group enters the phenolic or alcoholic group. The results which this method of preparation gives are particularly interesting in connection with the group of bodies employed in the manufacture of vanillin (*i. e.*, eugenol and iso-eugenol) and vanillin itself; but it is by no means confined to them, being of general application.

I dissolve in bisulfid of carbon or some other neutral solvent two molecular proportions of pyridin, and I add thereto one molecular proportion of chloro-sulfonic acid, keeping the mixture cool during the reaction. Chloro-sulfonate of pyridin is formed. I then add one molecular proportion of a phenol or of an alcohol, and the chloro-sulfonate of pyridin acts on the phenolic or alcoholic group, giving rise to hydrochloric acid, which combines with the second molecule of pyridin and at the same time forms the corresponding phenol or alcoholic sulfonate of pyridin. The reaction which gives rise to this product is the following:

$$R \cdot OH + ClSO_2 \cdot OH \cdot Py + Py = R \cdot O \cdot SO_2 \cdot OH \cdot Py + PyHCl.$$

When the reaction is finished, the bisulfid of carbon is driven off on the water-bath and there remains a mixture of the two salts of pyridin. This mixture is treated with a solution of potash until it becomes alkaline, and the pyridin is driven off by a jet of steam and recovered. The potassium salt obtained may be crystallized by evaporating to dryness and crystallizing in water or in alcohol. To obtain the free organic sulfonate, the potassium salt is treated to saturation with sulfuric or hydrochloric acid.

As an example of the uses to which this process can be put I will take the case of eugenol, iso-eugenol, and vanillin, from which the application of the invention generally will also be understood.

*First operation—Preparation of potassium eugenol sulfonate.*—31.6 kilograms of pyridin are dissolved in two hundred kilos of bisulfid of carbon, and to the liquid when cooled and agitated 23.2 kilograms of chloro-sulfonic acid are slowly added. Thirty-five kilos of oil of cloves are then poured in, and the bisulfid of carbon is all distilled off. The reaction between the chloro-sulfonic acid and the pyridin results in the formation of pyridin chloro-sulfonate, which then acts on the eugenol, forming pyridin eugenol sulfonate and liberating hydrochloric acid, according to the equation:

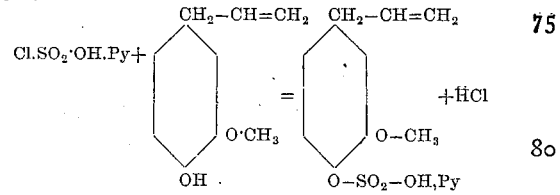

Having taken the precaution to use excess of pyridin, which fixes all the hydrochloric acid produced, the residue which remains after distilling the carbon bisulfid consists of a mixture of pyridin chloro-sulfonate and pyridin hydro-chlorid, which mixture is in the form of a thick syrup which is heated with a potash lye until the reaction of the liquid is alkaline to turmeric. In this way there are produced potassium eugenol sulfonate and potassium chlorid, pyridin being set free. The latter may be recovered by distillation or by driving off by a jet of steam and used for another operation.

*Second operation—Conversion of potassium eugenol sulfonate into potassium iso-eugenol sulfonate.*—The potassium eugenol sulfonate which I have isolated is a salt which forms nacreous leaflets very soluble in warm water and sparingly soluble in cold water. It melts and decomposes at 203° centigrade. It has the remarkable property of remaining undecomposed when an alkaline solution is boiled. If, however, the solution is acid, it is at once decomposed on boiling, forming potassium bisulfite and setting eugenol free, according to the equation:

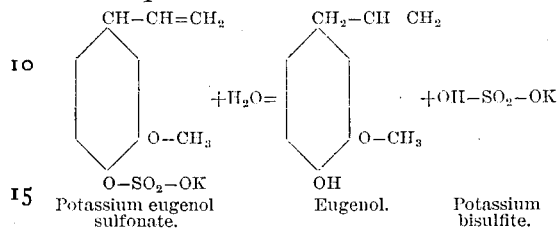

Potassium eugenol sulfonate.    Eugenol.    Potassium bisulfite.

Another remarkable property of potassium eugenol sulfonate is the great ease with which it is converted into potassium iso-eugenol sulfonate under the influence of alkalies. The presence of sulfonic acid in the eugenol molecule imparts to it a great tendency to undergo isomerization, and it is sufficient to boil the eugenol sulfonate with ten per cent. of potash at the ordinary pressure in order to complete the transformation in about two hours, according to the following equation:

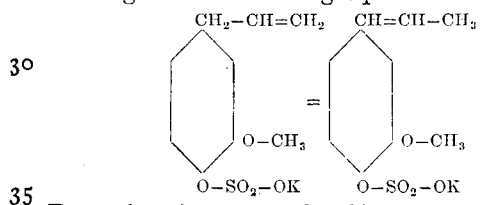

Potassium iso-eugenol sulfonate is very sparingly soluble in cold water, but dissolves readily in hot water. It melts and decomposes at 223° centigrade. I take advantage of the insolubility of this salt in water to completely remove the excess of potash which has brought about the isomerization. It suffices to exhaust it in order to obtain it in the purified state, and the potash may be set aside for a fresh operation, thus effecting a considerable economy.

*Third operation—Oxidation with ozone.*— Potassium iso-eugenol in a state of purity is dissolved in tepid water, (at a temperature of 60°,) and it is then oxidized, which is preferably done by exposing it to a current of ozone, although electrolysis can be used for the purpose, because the substance is soluble in water and can be treated in either an acid or an alkaline solution. Oxidation proceeds in a very regular manner, forming acetaldehyde and potassium vanillin sulfonate, according to the equation:

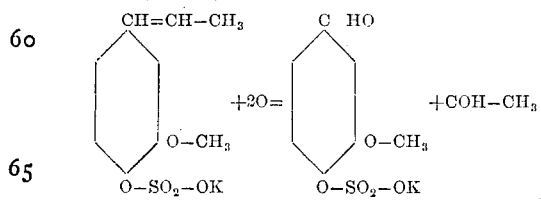

No trace of resin is produced, and the liquid remains perfectly clear and even decolorized. The end of the reaction is readily ascertained by taking a small quantity of the warm liquid and cooling it. While any iso-eugenol remains a deposit of the insoluble salt is formed on cooling, and when all the iso-eugenol is transformed into vanillin the liquid remains clear on cooling, because potassium vanillin sulfonate is soluble in cold water. When the reaction is completed, the oxidation is interrupted, the liquid cooled, and rendered strongly acid with sulfuric acid.

*Fourth operation—Extraction of potassium vanillin sulfonate.*—The acidulated solution is heated to boiling for a few moments, and at about 80° centigrade a reaction takes place, which is completed at 100° centigrade, vanillin separating as an oil, which sinks to the bottom of the liquid. The reaction is as follows:

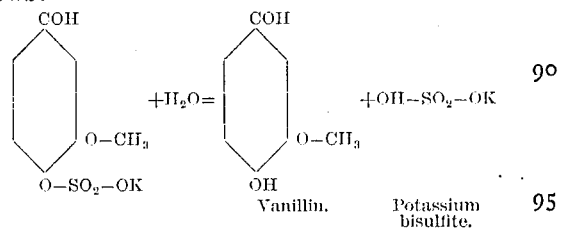

Vanillin.    Potassium bisulfite.

The vanillin is sufficiently pure to be crystallized without previous conversion into the bisulfite compound; but in order to avoid the disagreeable odor of a small quantity of some sulfur compound which accompanies it it is better to prepare the bisulfite compound by the ordinary method with a view to complete purification.

The final yield obtained in these operations is very high—almost fifty kilos of vanillin for one hundred kilos of eugenol.

The aforesaid chloro-sulfonic acid is preferably prepared as follows: Sulfuric anhydride, either pure or mixed with common sulfuric acid, is saturated with hydrogen chlorid and then distilled in a glass vessel. Pure chloro-sulfonic acid, boiling at 165° centigrade, is thus obtained in one operation.

If desired, soda may be used instead of potash in the treatment of the sulfonate of eugenol or the like to convert it into the corresponding iso compound.

Having now particularly described and ascertained the nature of my said invention and in what manner the same is to be performed, I declare that what I claim is—

1. In the manufacture of organic sulfonates and their derivatives, the process consisting in dissolving pyridin in a suitable solvent, adding chloro-sulfonic acid, adding a phenol and thereby liberating hydrochloric acid which combines with part of the pyridin.

2. The manufacture of organic sulfates by causing pyridin and chloro-sulfonic acid to react in a neutral solvent and adding a phenol, then removing the solvent and treating the resulting mixture with potash driving off the pyridin and saturating the potassium salt obtained with an acid, substantially as hereinbefore described.

3. In the manufacture of vanillin the production of potassium eugenol sulfonates by causing pyridin and chloro-sulfonic acid to react in a neutral solvent and adding the phenol, then removing the solvent and treating the resulting mixture with potash and driving off the pyridin substantially as hereinbefore described.

4. In the manufacture of vanillin, the production of potassium iso-eugenol sulfonates by causing pyridin and chloro-sulfonic acid to react in a neutral solvent and adding the phenol, then removing the solvent and treating the resulting mixture with potash, driving off the pyridin and boiling the sulfonates obtained with an alkaline solution, substantially as hereinbefore described.

In testimony whereof I have signed this specification in the presence of two subscribing witnesses.

ALBERT VERLEY.

Witnesses:
EDWARD P. MACLEAN,
EDWIN MITCHELL.